United States Patent

Na et al.

(10) Patent No.: US 9,017,130 B1
(45) Date of Patent: Apr. 28, 2015

(54) METHOD OF ATTACHING POLARIZING PLATE

(71) Applicant: Samsung Display Co., Ltd., Yongin, Gyeonggi-Do (KR)

(72) Inventors: GwanYoung Na, Osan-si (KR); Sangjae Kim, Seongnam-si (KR); Jihye Kim, Hwaseong-si (KR); Seungbeom Park, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/262,767

(22) Filed: Apr. 27, 2014

(30) Foreign Application Priority Data

Nov. 5, 2013 (KR) .......................... 10-2013-0133744

(51) Int. Cl.
*H01J 9/00* (2006.01)
*G02F 1/1335* (2006.01)

(52) U.S. Cl.
CPC .................. *G02F 1/133528* (2013.01)

(58) Field of Classification Search
CPC ........................ G02F 1/133528; G02F 1/1333
USPC ........................................ 445/24–25; 349/96
See application file for complete search history.

(56) References Cited

U.S. PATENT DOCUMENTS

| 2009/0201458 A1 | 8/2009 | Lee |
| 2012/0238176 A1 | 9/2012 | Hirata et al. |

FOREIGN PATENT DOCUMENTS

| JP | 10-282014 A | 10/1998 |
| KR | 1020060038789 A | 5/2006 |
| KR | 1020060061714 A | 6/2006 |
| KR | 1020100064250 A | 6/2010 |

OTHER PUBLICATIONS

English translation of KR2006038789.*

* cited by examiner

*Primary Examiner* — Anne Hines
(74) *Attorney, Agent, or Firm* — Cantor Colburn LLP

(57) ABSTRACT

An method of attaching a polarizing plate to a liquid crystal display panel includes inspecting an alignment axis of the liquid crystal display panel using an optical axis inspector; controlling a position of the liquid crystal display panel with respect to a reference alignment axis, according to a result of the inspecting the alignment axis of the liquid crystal display panel; providing the polarizing plate to the liquid crystal display panel at the controlled position thereof; and attaching the polarizing plate to the liquid crystal panel at the controlled position thereof.

17 Claims, 8 Drawing Sheets

METHOD OF ATTACHING POLARIZING PLATE

This application claims priority to Korean Patent Application No. 10-2013-0133744, filed on Nov. 5, 2013, and all the benefits accruing therefrom under 35 U.S.C. §119, the contents of which are hereby incorporated by reference in its entirety.

BACKGROUND

1. Field

The invention relates to a method of attaching a polarizing plate. More particularly, the invention relates to a method of attaching a polarizing plate to a liquid crystal display panel.

2. Description of the Related Art

A liquid crystal display includes a liquid crystal display panel and a pair of polarizing plates respectively disposed on upper and lower sides of the liquid crystal display panel.

The liquid crystal display panel includes two transparent substrates and a liquid crystal layer disposed between the two substrates, and various liquid crystal modes are determined depending on an arrangement and a liquid crystal phase of liquid crystal molecules included in the liquid crystal layer.

A manufacturing process of the liquid crystal display includes a process of attaching the polarizing plates to the liquid crystal panel.

SUMMARY

One or more exemplary embodiment of the invention provides a method of attaching a polarizing plate to a liquid crystal display panel, to improve a contrast ratio of the liquid crystal display panel.

An exemplary embodiment of the invention provides a method of attaching a polarizing plate to a liquid crystal display panel, including inspecting an alignment axis of the liquid crystal display panel using an optical axis inspector, controlling a position of the liquid crystal display panel with respect a reference alignment axis according to a result of the inspecting the alignment axis of the liquid crystal display panel, providing the polarizing plate to the liquid crystal display panel at the controlled position thereof, and attaching the polarizing plate to the liquid crystal panel at the controlled position thereof.

In the inspecting the alignment axis of the liquid crystal display panel, a twisted degree of an alignment axis of liquid crystals included in the liquid crystal display panel with respect to the reference alignment axis may be determined, using the optical axis inspector.

In the controlling the position of the liquid crystal display panel, the position of the liquid crystal display panel may be controlled in accordance with the twisted degree of the alignment axis using a rotator, after the inspecting the alignment axis. Therefore, the polarizing plate is attached to the liquid crystal display panel such that the alignment axis of the liquid crystals included in the liquid crystal display panel is substantially perpendicular to or in parallel to a transmission axis of the polarizing plate.

According to one or more exemplary embodiment of the invention, the polarizing plate is attached to the liquid crystal display panel after the alignment axis of the liquid crystal display panel is inspected and after the liquid crystal display panel is rotated by the twisted degree of the alignment axis of the liquid crystal display panel. Thus, the contrast ratio of the liquid crystal display may be improved.

BRIEF DESCRIPTION OF THE DRAWINGS

The above and other advantages of the disclosure will become readily apparent by reference to the following detailed description when considered in conjunction with the accompanying drawings, in which.

DETAILED DESCRIPTION

Figure 1:
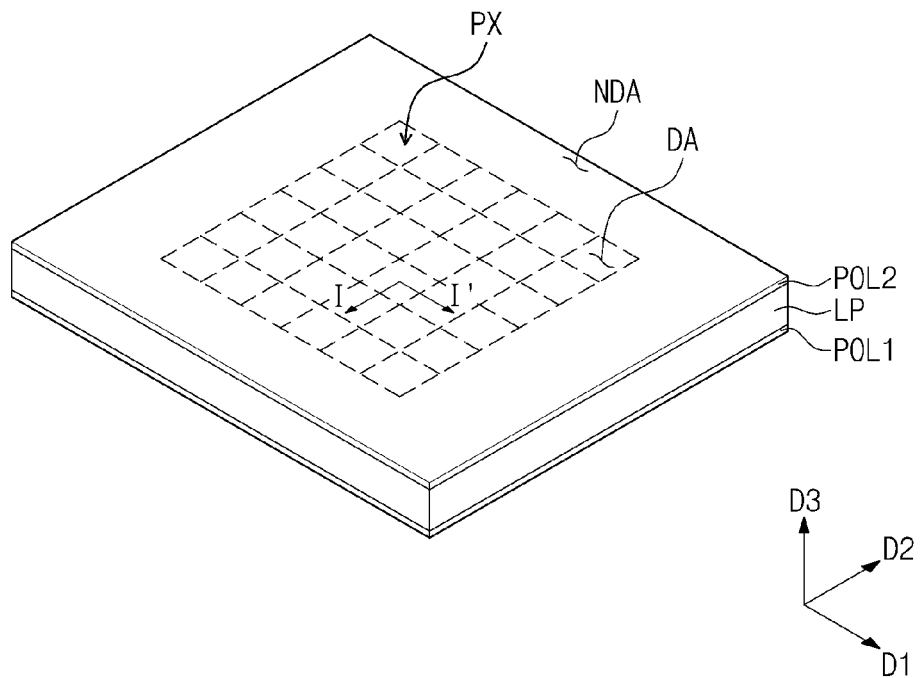
FIG. 1 is a perspective view showing an exemplary embodiment of a liquid crystal display.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below", "lower", "above", "upper" and the like, may be used herein for ease of description to describe one element or feature's relationship to another element(s) or feature(s) as illustrated in the figures.

It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
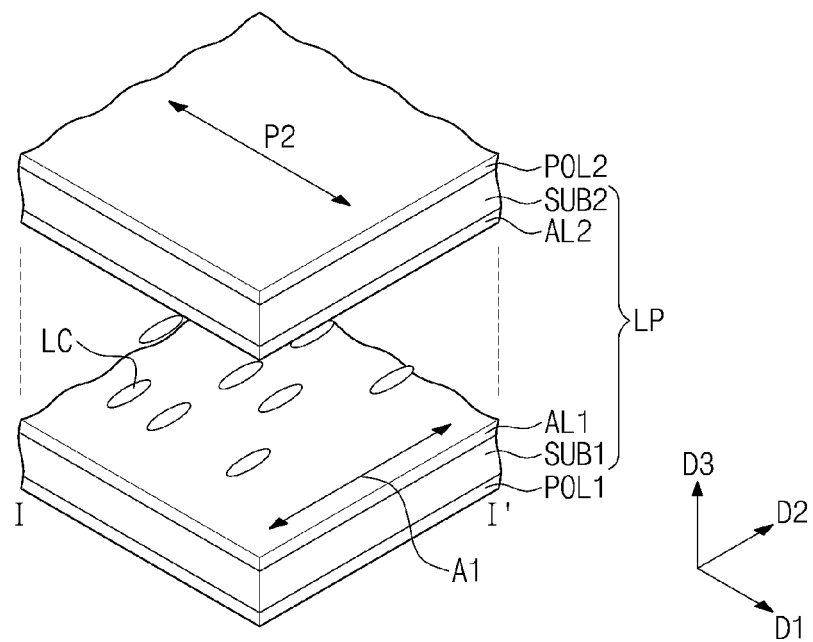
FIG. 2 is an exploded perspective view taken along line I-I' of FIG. 1.

FIG. 1 is a perspective view showing an exemplary embodiment of a liquid crystal display and FIG. 2 is an exploded perspective view taken along line I-I' of FIG. 1.

Referring to FIGS. 1 and 2, a liquid crystal display includes a liquid crystal display panel LP, a first polarizing plate POL1 disposed under the liquid crystal display panel LP, and a second polarizing plate POL2 disposed on the liquid crystal display panel LP.

The liquid crystal display panel LP includes a display area DA in which an image is displayed, and a non-display area NDA surrounding the display area DA. The liquid crystal display panel LP includes a first substrate SUB1, a second substrate SUB2 facing the first substrate SUB1, and liquid crystals LC interposed between the first substrate SUB1 and the second substrate SUB2.

Figure 3:
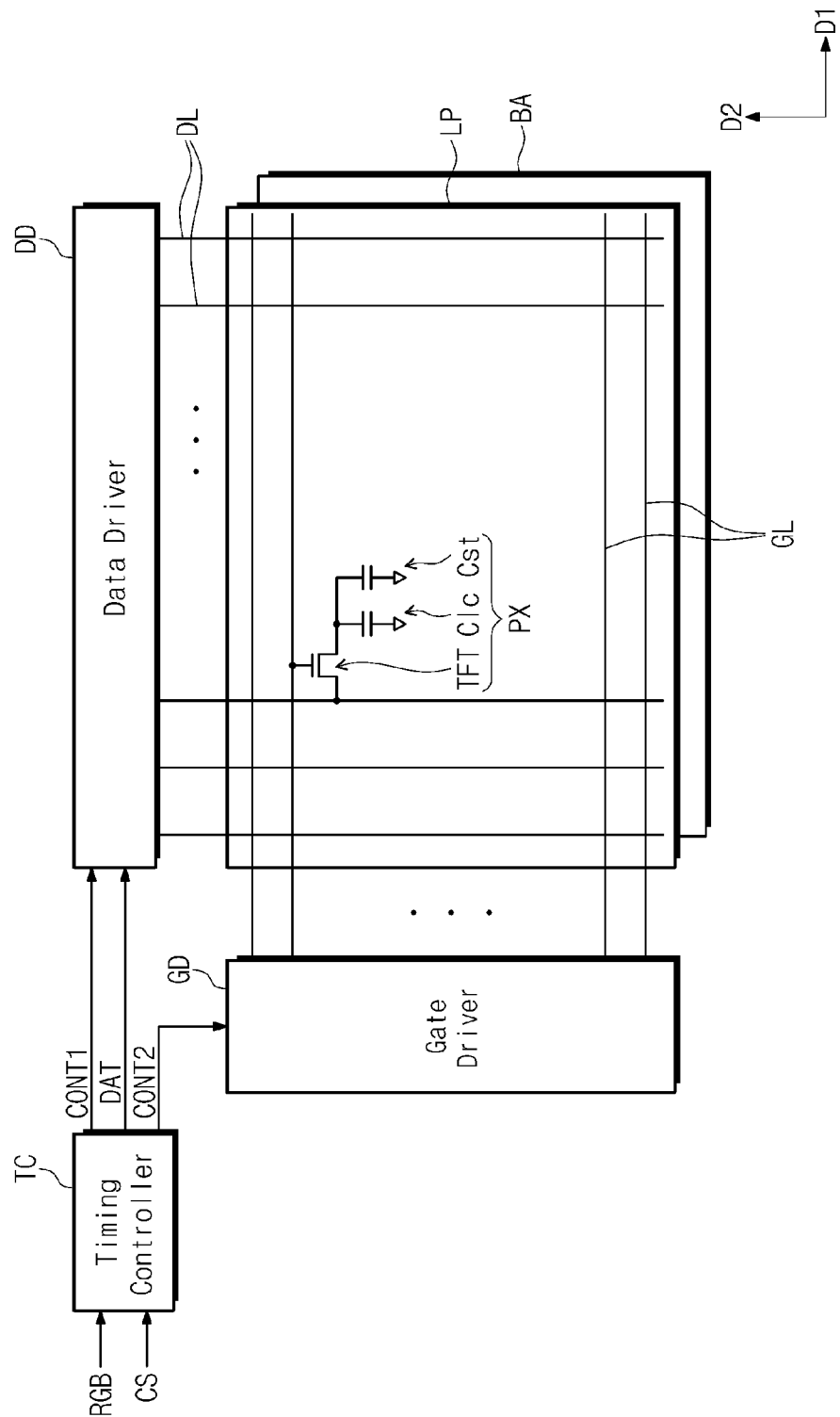
FIG. 3 is a block diagram showing the liquid crystal display of FIGS. 1 and 2.

FIG. 3 is a block diagram showing the liquid crystal display of FIGS. 1 and 2.

Referring to FIGS. 1 to 3, the first substrate SUB1 includes a plurality of gate lines GL, a plurality of data lines DL arranged to cross the gate lines GL, and a plurality of pixels PX connected the gate lines GL and the data lines DL.

The gate lines GL extend in a first direction D1 and are arranged substantially in parallel to each other. The data lines DL extend in a second direction D2 to cross the gate lines GL and are arranged substantially in parallel to each other.

Each pixel PX is connected to a corresponding gate line of the gate lines GL and a corresponding data line of the data lines DL, to display the image.

Each pixel PX includes a thin film transistor TFT, a liquid crystal capacitor Clc, and a storage capacitor Cst.

Although not shown in the figures, the thin film transistor TFT includes a gate electrode connected to the corresponding gate line of the gate lines GL, a source electrode connected to the corresponding data line of the data lines DL, and a drain electrode connected to the liquid crystal capacitor Clc and the storage capacitor Cst.

The liquid crystal capacitor Clc includes a pixel electrode and a common electrode which are disposed on the first substrate SUB1, as two terminals thereof, and the liquid crystals LC serve as a dielectric substance. Here, the pixel electrode and the common electrode are disposed on the first substrate SUB1, but the invention is not limited thereto or thereby. In an alternative exemplary embodiment, the common electrode may be disposed on the second substrate SUB2.

The pixel electrode is electrically connected to the drain electrode of the thin film transistor TFT, and the common electrode receives a reference voltage.

Each of the pixels PX may include a color filter (not shown) disposed on the second substrate SUB2 to correspond to the pixel electrode and to display one color of primary colors. Although not shown in figures, the color filter may be disposed on or under the pixel electrode disposed on the first substrate SUB1.

The liquid crystal display panel LP receives a light from a backlight assembly BA and controls the light from the backlight assembly BA in response to signals from a driving part to display the image.

The driving part includes a timing controller TC, a gate driver GD, and a data driver DD.

The data driver DD is connected to the data lines DL of the liquid crystal display panel LP and applies data voltages corresponding to image signals to the pixels PX.

Each of the gate driver GD and the data driver DD may include a plurality of driving integrated circuit chips directly mounted on the liquid crystal display panel LP or indirectly attached to the liquid crystal display panel LP in a tape carrier package ("TCP") form after being mounted on a flexible printed circuit film. In addition, the gate driver GD and the data driver DD may be directly integrated on the liquid crystal display panel LP, for example, without integrated circuit chips or the TCP form.

The timing controller TC receives image signals RGB and control signals CS from an external source (not shown), such as a vertical synchronization signal, a horizontal synchronization signal, a clock signal, a data enable signal, etc., to control the display of the image signals RGB. The timing controller TC processes the image signals RGB by taking an operation condition of the liquid crystal display panel LP into consideration in response to the control signals CS and applies data signals DAT and a first control signal CONT1 to the data driver DD. The timing controller TC applies a second control signal CONT2 to the gate driver GD. The first control signal CONT1 includes a clock signal, a polarity inversion signal, and a line latch signal, and the second control signal CONT2 includes a vertical synchronization start signal, an output enable signal, and a gate pulse signal.

The data driver DD receives and sequentially shifts the data signals DAT corresponding to the pixels PX arranged in one row in response to the second control signal CONT1 from the timing controller TC. The data driver DD applies data voltages corresponding to the data signals to the data lines DL.

The gate driver GD applies a gate-on voltage to the gate lines GL in response to the first control signal CONT2.

Accordingly, each of the pixels PX is turned on the gate-on voltage and the turned-on pixel PX receives a corresponding data voltage from the data driver DD, thereby displaying a desired image.

Referring to FIG. 2 again, the liquid crystal display panel LP includes a first alignment layer AL1 disposed on the first substrate SUB1 and a second alignment layer AL2 disposed under the second substrate SUB2 to face the first alignment layer AL1.

The liquid crystals LC are aligned in a predetermined direction along the alignment axes of the first and second alignment layers AL1 and AL2. In the illustrated exemplary embodiment, for instance, the liquid crystals LC are aligned in a second direction D2 on the first alignment layer AL1 having a first alignment axis A1 extending in the second direction D2.

The liquid crystal display includes the first polarizing plate POL1 disposed under the first substrate SUB1 and the second polarizing plate POL2 disposed on (e.g., above) the second substrate SUB2. Each of the first and second polarizing plates POL1 and POL2 have a transmission axis extended in one direction to transmit the light from the backlight assembly BA in the one direction. In the illustrated exemplary embodiment, for instance, the second polarizing plate POL2 having a second transmission axis P2 extending in the first direction D1 transmits only linearly-polarized light in the first direction D1 among the light incident thereto.

Figure 4:
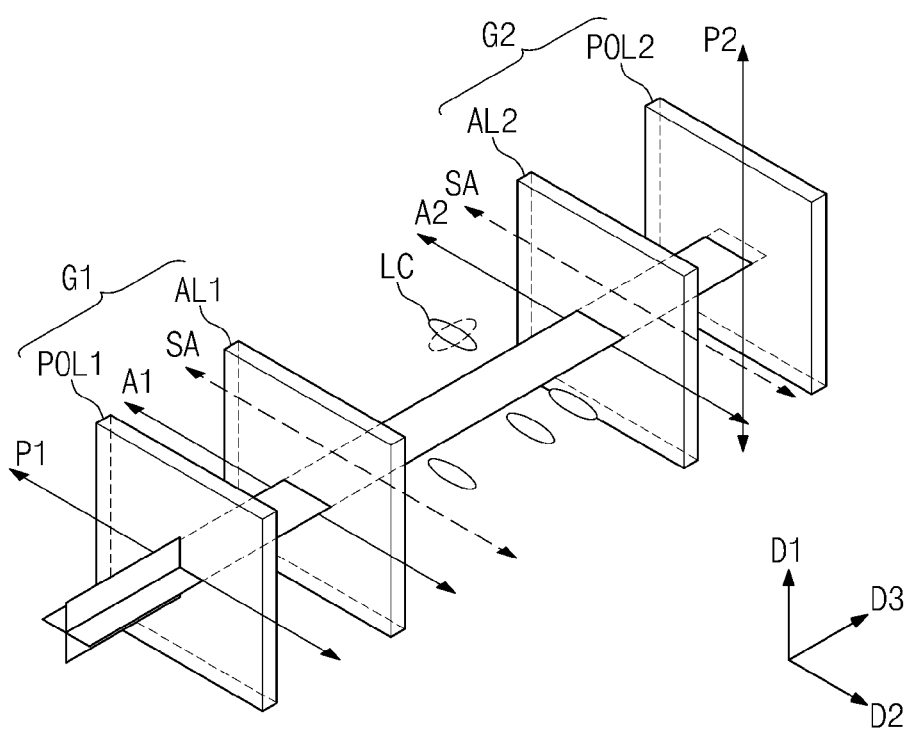
FIG. 4 is view showing an exemplary embodiment of a black mode in which a liquid crystal display displays a black color when no electric field is applied to the liquid crystal display.

FIG. 4 is view showing an exemplary embodiment of a black mode in which a liquid crystal display displays a black color when no electric field is applied to the liquid crystal display.

Here, the arrangement of the liquid crystals LC in accordance with the application of the electric field to the liquid crystal display panel LP and the travel of the light will be described in detail. FIG. 4 shows the black mode in which the liquid crystal display panel LP displays the black color when the electric field is not applied to the liquid crystal display panel LP (hereinafter, referred to as inactivation state).

The first alignment layer AL1 has the first alignment axis A1 in which the liquid crystals LC are aligned along a reference alignment axis SA extending in the second direction D2. The second alignment layer AL2 has a second alignment axis A2 in which the liquid crystals LC are aligned along the reference alignment axis SA extending in the second direction D2.

Each of the first and second alignment layers AL1 and AL2 may be a horizontal alignment layer, and the first alignment axis A1 and the second alignment axis A2 may be substantially in parallel to each other. Where the first and second alignment axes A1 and A2 are parallel to each other, the liquid crystals LC are aligned substantially in parallel to each other between the first and second alignment layers AL1 and AL2 in the inactivation state.

In the illustrated exemplary embodiment, the first and second alignment axes A1 and A2 are substantially in parallel to each other along the second direction D2, but the invention is not limited thereto or thereby. That is, although not shown in figures, the first alignment axis A1 and the second alignment axis A2 may be substantially vertical (e.g., perpendicular) to each other. Where the first and second alignment axes A1 and A2 are perpendicular to each other, the liquid crystals LC are continuously twisted between the first alignment layer AL1 and the second alignment layer AL2.

Among the light from the backlight assembly BA incident on the first polarizing plate POL1, only linearly-polarized light substantially in parallel to the first transmission axis P1 transmits through the first polarizing plate POL1 and all other light is absorbed by the first polarizing plate POL1. The linearly-polarized light parallel to the first transmission axis P1 passes through the liquid crystals LC and then is absorbed by the second polarizing plate POL2 having the second transmission axis P2 substantially vertical to the first transmission axis P1, thereby displaying the black color.

Figure 5A:
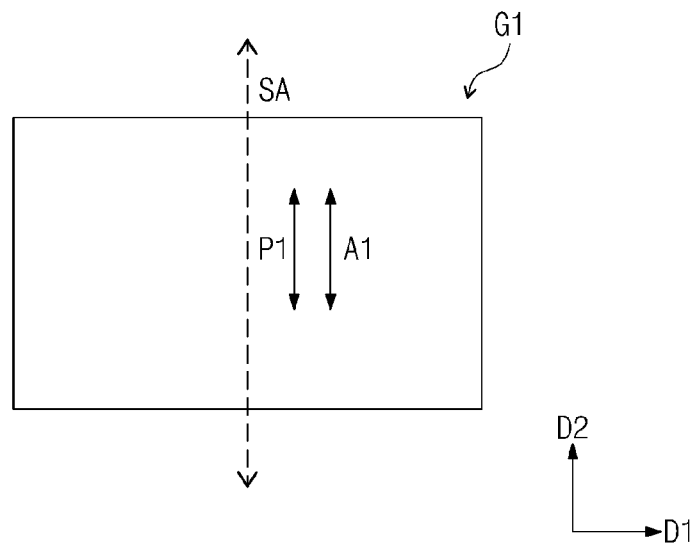
FIG. 5A is a plan view explaining a relationship between a first alignment axis and a first transmission axis shown in FIG. 4.
Figure 5B:
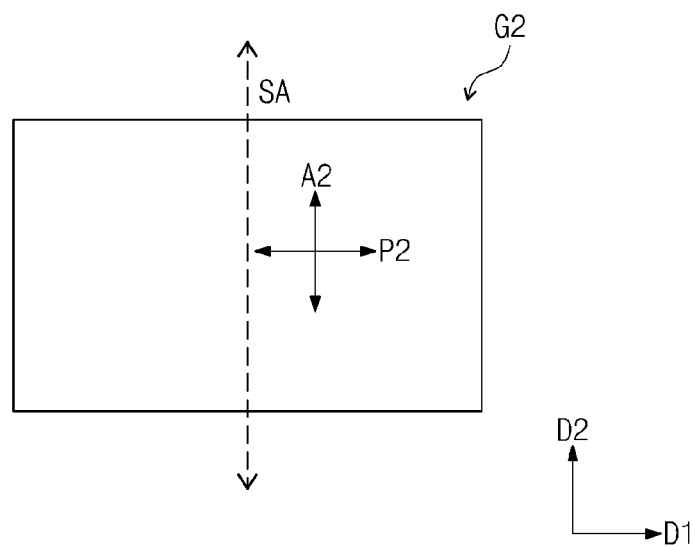
FIG. 5B is a plan view explaining a relationship between a second alignment axis and a second transmission axis shown in FIG. 4.

FIG. 5A is a plan view explaining a relationship between the first alignment axis and the first transmission axis shown in FIG. 4, and FIG. 5B is a plan view explaining a relationship between the second alignment axis and the second transmission axis shown in FIG. 4.

FIG. 5A shows a first group G1 including the first polarizing plate POL1 and the first alignment layer AL1 shown in FIG. 4 in a plan view (e.g., a top plan view) and FIG. 5B shows a second group G2 including the second polarizing plate POL2 and the second alignment layer AL2 shown in FIG. 4 in the plan view.

As shown in FIG. 5A, the first alignment axis A1 is substantially in parallel to the reference alignment axis SA extending in the second direction D2. In addition, the first transmission axis P1 is substantially in parallel to the first alignment axis A1.

As shown in FIG. 5B, the second alignment axis A2 is substantially in parallel to the reference alignment axis SA extending in the second direction D2. In addition, the second transmission axis P2 is substantially perpendicular to the second alignment axis A2.

Therefore, the liquid crystal display displays the black color since the linearly-polarized light is absorbed by the second polarizing plate POL2 having the second transmission axis P2 substantially perpendicular to the first transmission axis P1 after passing through the first transmission axis P1 of the first polarizing plate POL1.

When the electric field is formed in the liquid crystal display in the black mode, the liquid crystals LC are twisted along the electric field, e.g., dotted line liquid crystal LC in FIG. 4, and thus a direction in which the linearly-polarized light travels is changed and the linearly-polarized light transmits through the second polarizing plate POL2. Thus, a gray scale of the liquid crystal display is changed and the image is displayed.

In the illustrated exemplary embodiment, the liquid crystal display of the black mode has been described as a representative example, but the above-mentioned operation may be realized by a liquid crystal display in a white mode to which the electric field is applied. Where the direction in which the linearly-polarized light travels in the white mode is changed and the linearly-polarized light transmits through the second polarizing plate POL2, the first transmission axis P1 and the second transmission axis P2 are substantially in parallel to each other.

In the illustrated exemplary embodiment, the liquid crystal display is operated in a plane-to-switching ("PLS") mode in which the pixel electrode and the common electrode are both disposed within the first substrate SUB1, but the invention is not limited thereto or thereby.

As described above, a display quality of the liquid crystal display is determined depending on the relationship between the alignment axes of the alignment layers and the transmission axes of the polarizing plates. Accordingly, when the liquid crystal display is manufactured, the alignment axes and the transmission axes are required to form an angle appropriate to the driving mode of the liquid crystal display.

Hereinafter, an exemplary embodiment of a method of attaching a polarizing plate to a liquid crystal display panel and an apparatus therefor, will be described in detail.

Figure 6:
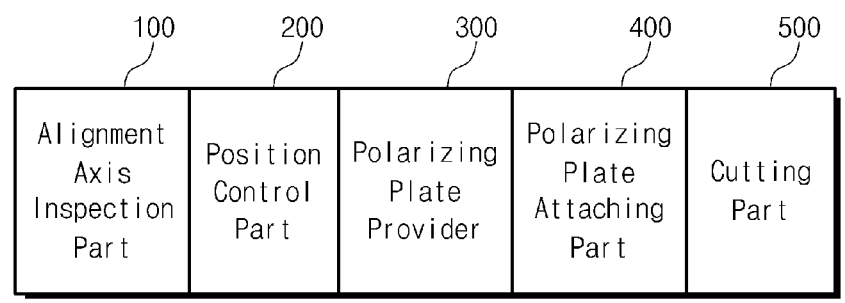
FIG. 6 is a schematic diagram showing an exemplary embodiment of an apparatus for attaching a polarizing plate.

FIG. 6 is a schematic diagram showing an exemplary embodiment of an apparatus which attaches a polarizing plate.

Referring to FIG. 6, the apparatus for attaching the polarizing plate includes an alignment axis inspection part 100 configured to inspect the alignment axis of the liquid crystal display panel, a position control part 200 configured to control a position of the liquid crystal display panel according to the result of inspecting the alignment axis, a polarizing plate provider 300 configured to provide the polarizing plate to a liquid crystal display panel, a polarizing plate attaching part 400 configured to attach the polarizing plate to the liquid crystal display panel, and a cutting part 500 configured to cut the polarizing plate.

Figure 7:
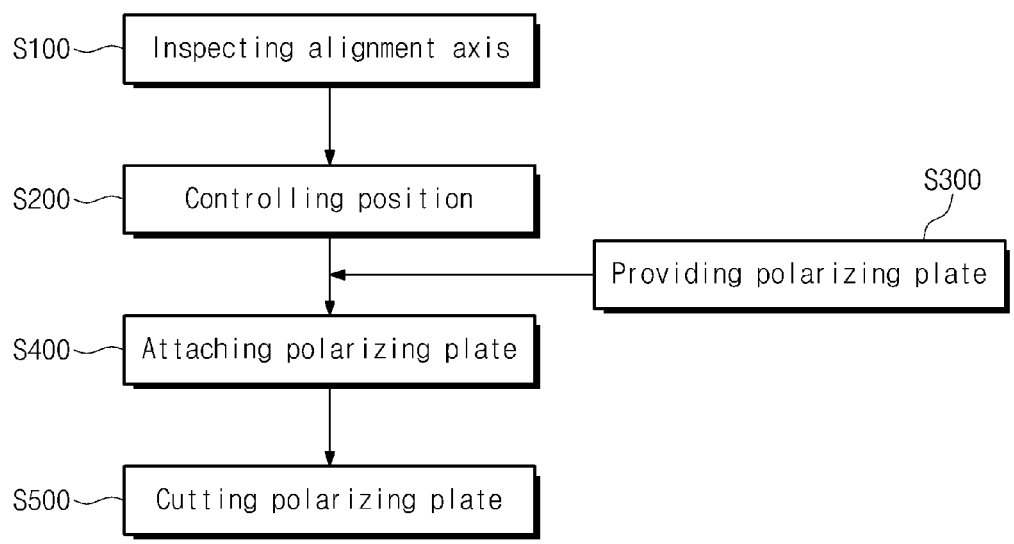
FIG. 7 is a flowchart showing an exemplary embodiment of a method of attaching a polarizing plate according to the invention.

FIG. 7 is a flowchart showing an exemplary embodiment of a method of attaching a polarizing plate.

Referring to FIG. 7, the method of attaching the polarizing plate includes inspecting the alignment axis (S100), controlling the position of the liquid crystal display panel (S200), providing the polarizing plate to the liquid crystal display panel (S300), attaching the polarizing plate to the liquid crystal display (S400) and cutting the polarizing plate (S500).

In the inspecting the alignment axis (S100), a twisted degree of the alignment axis of liquid crystals aligned in the liquid crystal display panel with respect to the reference alignment axis, is determined, such as by using an optical axis inspector.

The optical axis inspector may include a lamp to inspect the alignment axis. The light emitted from the lamp is irradiated to the liquid crystal display panel. Accordingly, the optical axis inspector may calculate the twisted degree of the alignment axis with respect to the reference alignment axis. The optical axis inspector may include a sensor in addition to the lamp, but the invention is not limited thereto or thereby, as long as the optical axis inspector can determine and calculate the twisted angle of the alignment axis.

Figure 8A:
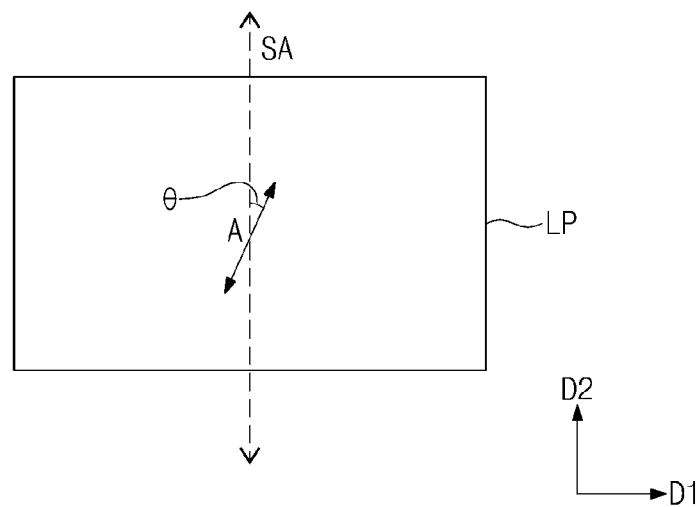
FIG. 8A is a plan view showing an exemplary embodiment of a twisted alignment axis of a liquid crystal display.

FIG. 8A is a plan view showing an exemplary embodiment of a twisted alignment axis of the liquid crystal display.

As shown in FIG. 8A, the twisted angle θ of the alignment axis A of the liquid crystals aligned in the liquid crystal display panel LP with respect to the reference alignment axis SA extending in the second direction D2, may be measured by the optical axis inspector.

Referring to FIG. 7 again, after the inspecting the alignment axis (S100), the position of the liquid crystal display panel is controlled in accordance with the twisted angle θ, such as by using a rotating part, in the controlling of the position (S200).

Figure 8B:
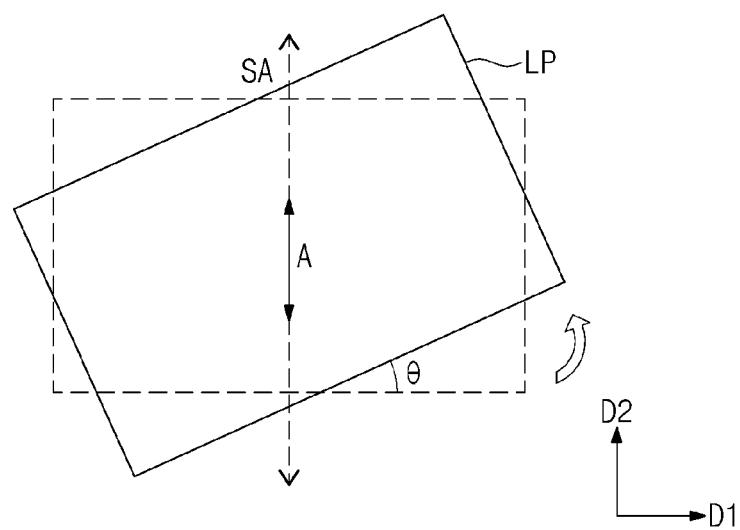
FIG. 8B is a plan view showing an exemplary embodiment of a process of controlling a position of a liquid crystal display panel.

FIG. 8B is a plan view showing an exemplary embodiment of a process of controlling the position of the liquid crystal display panel.

As shown in FIG. 8B, the rotation part rotates the liquid crystal display panel LP in a direction opposite to the twisted direction of the alignment axis A. Referring to FIG. 8A, since the alignment axis A is twisted in a clockwise direction from the reference alignment axis SA, the liquid crystal display panel LP is rotated in a counterclockwise direction (indicated by the curved arrow), such that the alignment axis A becomes substantially parallel to the reference alignment axis SA.

Referring to FIG. 7 again, the polarizing plate is provided to the liquid crystal display panel LP in the providing the polarizing plate (S300). The polarizing plate may be in a roll form, such as being wrapped around a core or cylinder, in the providing the polarizing plate (S300).

When the polarizing plate is provided onto the liquid crystal display panel LP, the polarizing plate is attached to the liquid crystal display panel LP, such as by using a roller in the attaching the polarizing plate (S400).

Figure 8C:
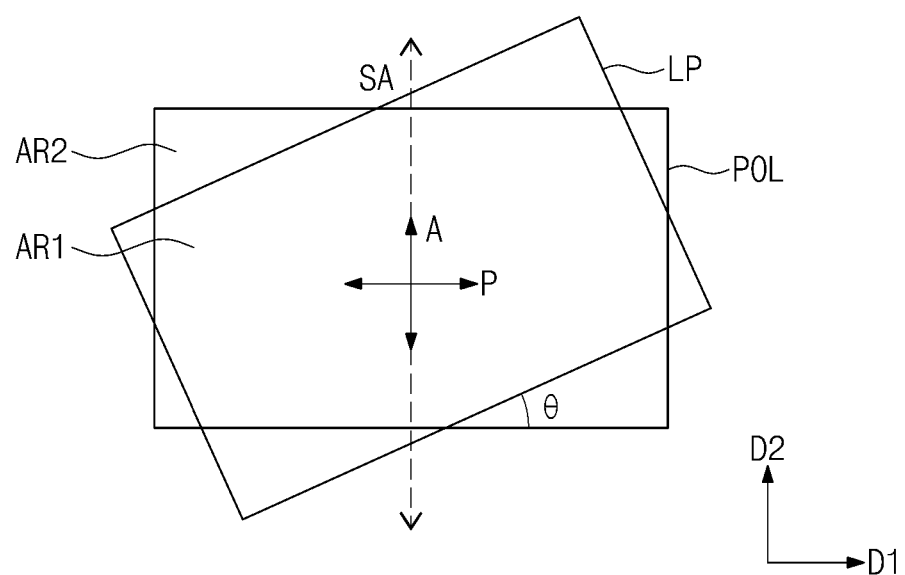
FIG. 8C is a plan view for explaining an exemplary embodiment of a process of attaching a polarizing plate to a liquid crystal display panel.

FIG. 8C is a plan view explaining an exemplary embodiment of a process of attaching the polarizing plate to the liquid crystal display panel.

As shown in FIG. 8C, the polarizing plate POL having the transmission axis P in the first direction D1 which has been provided onto the liquid crystal display panel LP, is and attached to the liquid crystal display panel LP that has been rotated (S400). Thus, the transmission axis P is substantially perpendicular to the alignment axis A of the liquid crystals aligned in the liquid crystal display panel LP. In the providing the polarizing plate POL to the liquid crystal display panel LP, the transmission axis of the polarizing plate POL may be oriented with respect to the reference alignment axis SA, and since the liquid crystal display panel LP has been rotated with respect to the reference alignment axis SA, the transmission axis of the polarizing plate POL and the alignment axis of the liquid crystal display panel LP may then be oriented with respect to each other.

Here, the polarizing plate POL has the transmission axis P in the first direction D1, but the invention is not limited thereto or thereby. In an alternative exemplary embodiment, the polarizing plate POL may have the transmission axis P in the second direction D2 and may be attached to the liquid crystal display panel LP such that the transmission axis P is substantially in parallel to the alignment axis A of the liquid crystals aligned in the liquid crystal display panel LP.

When the polarizing plate POL is attached to the rotated liquid crystal display panel LP, the polarizing plate POL includes a first portion AR1 making contact with the liquid crystal display panel LP and a second portion AR2 except for the first portion AR1, which does not make contact with the liquid crystal display panel LP.

Referring to FIG. 7 again, the second portion AR2 of the polarizing plate POL may be removed from a remainder of the polarizing plate POL, such as by being cut away from the polarizing plate POL using an optical tool, e.g., a laser beam generator, in the cutting the polarizing plate (S500). A portion of the liquid crystal display panel LP may be exposed by the first portion AR1 of the polarizing plate POL making contact with the liquid crystal display panel LP. The exposed portion of the liquid crystal display panel LP may correspond to the non-display area NDA of the liquid crystal display, such that material of the polarizing plate POL is omitted in the non-display area NDA.

Figure 9:
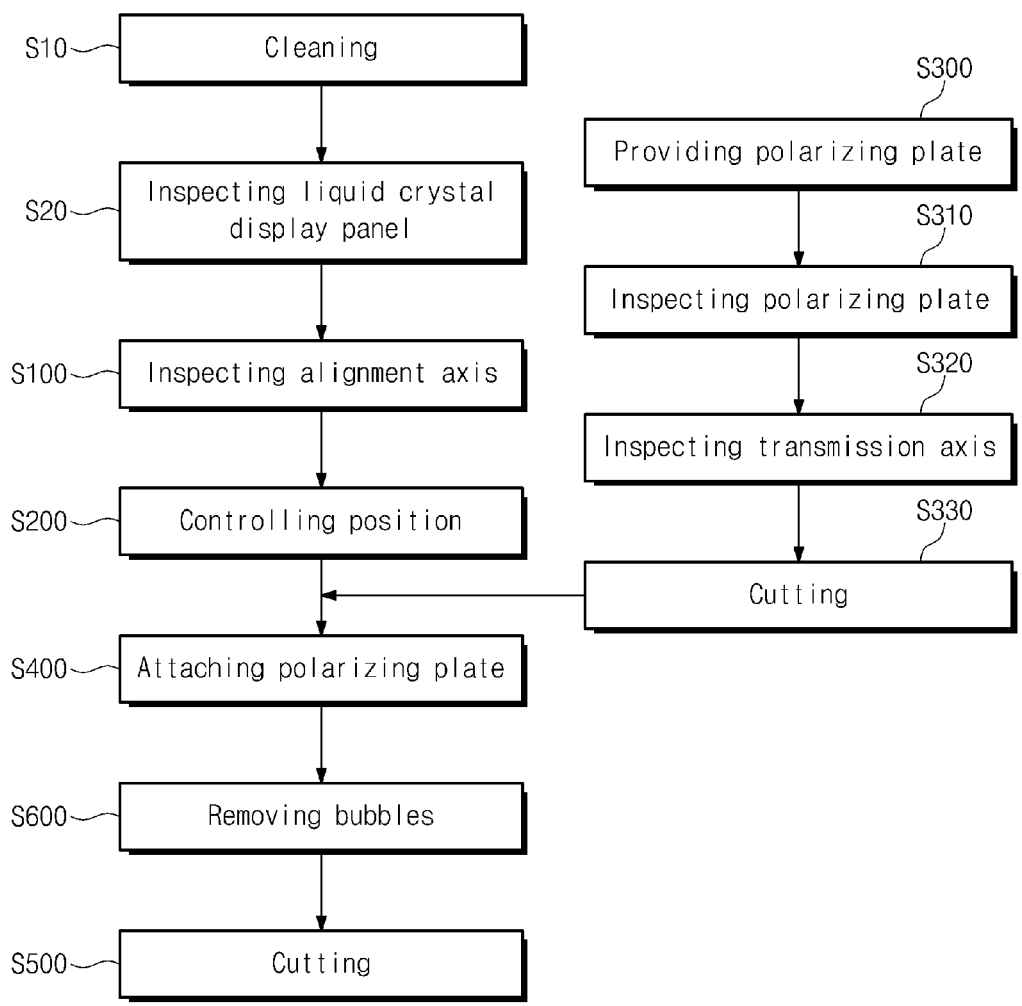
FIG. 9 is a flowchart showing another exemplary embodiment of a method of attaching a polarizing plate according to the invention.

FIG. 9 is a flowchart showing another exemplary embodiment of a method of attaching a polarizing plate according to the invention.

In the following description of the method of attaching the polarizing plate according to the invention illustrated in FIG. 9, different points from the above-mentioned method of attaching the polarizing plate illustrated in FIG. 7-8C will be mainly described.

Referring to FIG. 9, the method of attaching the polarizing plate to the liquid crystal display panel includes inspecting the alignment axis of the liquid crystal display panel (S100), controlling the position of the liquid crystal display panel (S200), providing the polarizing plate to the liquid crystal display panel (S300), attaching the polarizing plate to the liquid crystal display (S400) and cutting the polarizing plate (S500).

In addition, the method of attaching the polarizing plate may further include cleaning the liquid crystal display panel (S10) and inspecting the liquid crystal display panel for foreign matter or a defect on the liquid crystal display panel (S20), which are performed before the inspecting the alignment axis of the liquid crystal display panel (S100).

Further, the method of attaching the polarizing plate may further include inspecting the polarizing plate for foreign matter or a defect on the polarizing plate (S310), inspecting the transmission axis of the polarizing plate (S320), and cutting the polarizing plate by taking the width and/or the length of the liquid crystal display panel (S330) into consideration, which are performed before the polarizing plate is attached to the liquid crystal display panel (S400).

In the inspecting the transmission axis (S320), a twisted degree of the transmission axis of the polarizing plate with respect to a reference transmission axis is calculated, such as by using the optical axis inspector. Accordingly, the position of the liquid crystal display panel may be controlled in consideration of the twisted degree of the transmission axis in the controlling the position of the liquid crystal display panel (S200).

In the cutting the polarizing plate (S330), a portion of the polarizing plate which will not overlap the liquid crystal display panel, may be removed such as by cutting, before the polarizing plate is attached to the liquid crystal display panel (S400). The portion of the polarizing plate which is removed, may be calculated in consideration of the twisted degree of the transmission axis (S320) and the twisted degree of the alignment axis of liquid crystals aligned in the liquid crystal display panel (S100).

The method of attaching the polarizing plate may further include removing bubbles formed between the polarizing plate and the liquid crystal display panel (S600) after the attaching the polarizing plate to the liquid crystal display panel (S400). In an exemplary embodiment of the removing the bubbles (S600), the bubbles are removed by controlling a temperature and/or a pressure in processes during or after the attaching the polarizing plate to the liquid crystal display panel, and thus the polarizing plate may be adhered to the liquid crystal display panel without bubbles therebetween.

The removing the bubbles (S600) may be performed after or before the cutting the polarizing plate (S500).

In one or more exemplary embodiment described above, when the polarizing plate is attached to the liquid crystal display panel using the method of attaching the polarizing plate according to the invention, a method of reducing the tolerance between the alignment axis and the transmission axis is as follows.

The following Table 1 shows a light leakage degree in accordance with the angle (degrees: °) of the alignment axis and the angle (degrees: °) of the transmission axis in a black state of the PLS mode liquid crystal display.

In detail, Table 1 represents the light leakage degree according to the angle difference between each alignment axis and each transmission axis in percentages (%) on the assumption that the light leakage degree is a reference light leakage (100%) when the angle of the alignment axis against the reference alignment axis is zero (0°) and the angle of the transmission axis against the reference transmission axis is zero (0°).

Here, when the angle of the alignment axis is maintained at zero (0°), the light leakage may be reduced in the black state even though an error in the transmission axis is considered. Therefore, the contrast ratio of the liquid crystal display may be improved.

In one or more exemplary embodiment, the twisted degree of the alignment axis may be calculated by inspecting the alignment axis of the liquid crystal display panel before the polarizing plate is attached to the liquid crystal display panel. Since the polarizing plate is attached to the liquid crystal display panel after the position of the liquid crystal display panel is controlled in accordance with the calculated twisted degree of the alignment axis, the alignment axis of the liquid crystal display panel and the transmission axis of the polarizing plate are maintained at a uniform angle. As a result, the contrast ratio of the liquid crystal display may be improved. In addition, defects of the liquid crystal display, which are generated in manufacturing of the liquid crystal display, may be reduced.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A method of attaching a polarizing plate to a liquid crystal display panel, comprising:
    inspecting an alignment axis of liquid crystals in the liquid crystal display panel using an optical axis inspector;
    controlling a position of the liquid crystal display panel with respect to a reference alignment axis, according to a result of the inspecting the alignment axis of the liquid crystals in the liquid crystal display panel;
    providing the polarizing plate to the liquid crystal display panel at the controlled position thereof; and
    attaching the polarizing plate to the liquid crystal panel at the controlled position thereof.

TABLE 1

|  |  | Angle of alignment axis (°) | | | | | | | | | | |
|---|---|---|---|---|---|---|---|---|---|---|---|---|
|  |  | −0.5 | −0.4 | −0.3 | −0.2 | −0.1 | 0 | 0.1 | 0.2 | 0.3 | 0.4 | 0.5 |
| Angle of transmission axis (°) | −0.5 | 246 | 219 | 195 | 176 | 160 | 148 | 139 | 135 | 134 | 137 | 144 |
|  | −0.4 | 219 | 194 | 172 | 154 | 141 | 130 | 124 | 122 | 123 | 128 | 137 |
|  | −0.3 | 195 | 172 | 153 | 137 | 125 | 117 | 113 | 113 | 116 | 123 | 134 |
|  | −0.2 | 176 | 154 | 137 | 123 | 114 | 108 | 105 | 107 | 113 | 122 | 135 |
|  | −0.1 | 160 | 141 | 125 | 114 | 106 | 102 | 102 | 105 | 113 | 124 | 139 |
|  | 0 | 148 | 131 | 117 | 108 | 102 | 100 | 102 | 108 | 117 | 131 | 148 |
|  | 0.1 | 139 | 124 | 113 | 105 | 102 | 102 | 106 | 114 | 125 | 141 | 160 |
|  | 0.2 | 135 | 122 | 113 | 107 | 105 | 108 | 114 | 123 | 137 | 154 | 176 |
|  | 0.3 | 134 | 123 | 116 | 113 | 113 | 117 | 125 | 137 | 153 | 172 | 195 |
|  | 0.4 | 137 | 128 | 123 | 122 | 124 | 130 | 141 | 154 | 172 | 194 | 219 |
|  | 0.5 | 144 | 137 | 134 | 135 | 139 | 148 | 160 | 176 | 195 | 219 | 246 |

2. The method of claim 1, wherein
the polarizing plate is in roll form, and
the providing the polarizing plate comprises providing the roll form polarizing plate to the liquid crystal display panel at the controlled position thereof.

3. The method of claim 1, further comprising cutting the polarizing plate after the attaching the polarizing plate, wherein
the polarizing plate comprises a first portion making contact with the liquid crystal display panel at the controlled position thereof, and a second portion except for the first portion, which does not make contact with the liquid crystal display panel at the controlled position thereof, and
the second portion of the polarizing plate is removed from a remaining portion of the polarizing plate by the cutting the polarizing plate after the attaching the polarizing plate.

4. The method of claim 3, wherein the removing the second portion is performed by an optical tool.

5. The method of claim 1, further comprising removing bubbles formed between the liquid crystal display panel and the polarizing plate, after the attaching the polarizing plate.

6. The method of claim 1, further comprising inspecting a transmission axis of the polarizing plate, using the optical axis inspector, after the providing the polarizing plate.

7. The method of claim 1, further comprising inspecting the polarizing plate for a defect, after the providing the polarizing plate.

8. The method of claim 7, further comprising cutting the polarizing plate along a widthwise direction of the liquid crystal display panel, after the providing the polarizing plate.

9. The method of claim 7, further comprising cutting the polarizing plate along a lengthwise direction of the liquid crystal display panel, after the providing the polarizing plate.

10. The method of claim 1, further comprising inspecting the liquid crystal display panel for a defect, before the inspecting the alignment axis.

11. The method of claim 10, further comprising cleaning the liquid crystal display panel, before the inspecting the liquid crystal display panel for the defect.

12. The method of claim 1, wherein the controlling the position of the liquid crystal display panel comprises rotating the liquid crystal display panel in a direction opposite to a direction in which the alignment axis of the liquid crystals in the liquid crystal display panel is twisted with respect to the reference alignment axis.

13. The method of claim 1, wherein the attaching the polarizing plate attaches the polarizing plate to the liquid crystal display panel such that the alignment axis of the liquid crystals in the liquid crystal display panel is substantially perpendicular to a transmission axis of the polarizing plate.

14. The method of claim 1, wherein the attaching the polarizing plate attaches the polarizing plate to the liquid crystal display panel such that the alignment axis of the liquid crystals in the liquid crystal display panel is substantially parallel to a transmission axis of the polarizing plate.

15. The method of claim 1, wherein the inspecting the alignment axis of the liquid crystals in the liquid crystal display panel comprises determining a twisted degree of the alignment axis of the liquid crystals in the liquid crystal display panel, with respect to the reference alignment axis.

16. The method of claim 15, wherein the controlling the position of the liquid crystal display panel comprises rotating the liquid crystal display panel in a direction opposite to a direction of the twisted degree of the alignment axis of the liquid crystals in the liquid crystal display panel with respect to the reference alignment axis, after the inspecting the alignment axis of the liquid crystals in the liquid crystal display panel, to define the controlled position of the liquid crystal display panel.

17. The method of claim 16, wherein in the attaching the polarizing plate to the liquid crystal panel at the defined controlled position thereof, after the liquid crystal panel is rotated in the direction opposite to the direction of the twisted degree of the alignment axis of the liquid crystals in the liquid crystal display panel, the alignment axis of the liquid crystals in the liquid crystal display panel is aligned substantially parallel to or perpendicular to a transmission axis of the polarizing plate.

* * * * *